Patented June 12, 1934

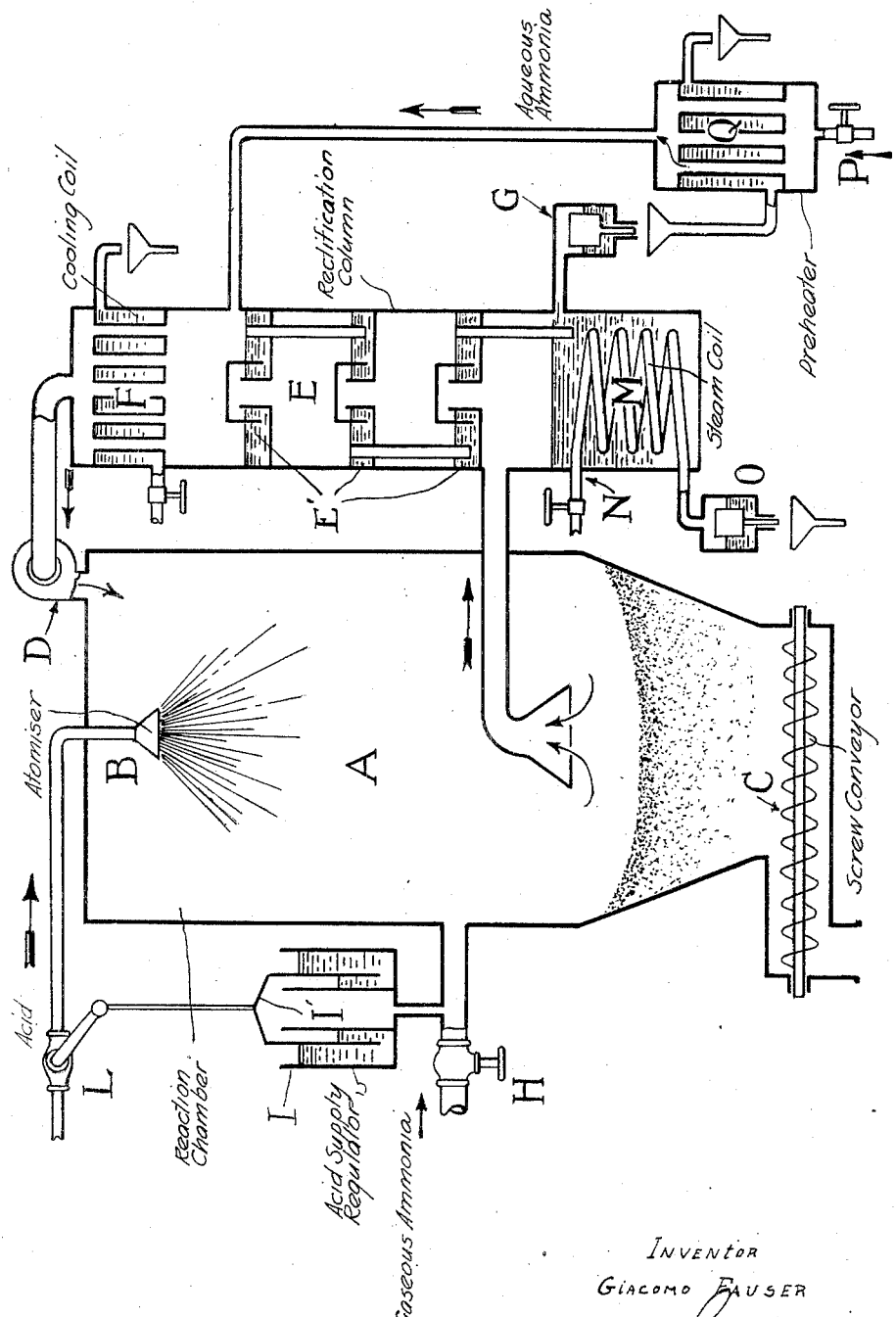

1,962,185

UNITED STATES PATENT OFFICE 1,962,185

PROCESS FOR THE PRODUCTION OF SOLID AMMONIUM SALTS

Giacomo Fauser, Novara, Italy, assignor to Montecatini, Societa Generale Per L'Industria Mineraria Ed Agricola, Milan, Italy, a joint-stock company of Italy Application May 8, 1928, Serial No. 276,181
In Italy June 14, 1927

4 Claims. (Cl. 23—50)

The process at present in use for the production of ammonium salts is that of bubbling the gaseous ammonia through an acid and of separating from the mother lyes the salt crystals that have formed. This process is very complicated inasmuch as it involves the employment of ejectors in order to raise the salt that has deposited at the bottom of the saturator; of centrifugal machines or filters in order to separate the mother lyes; and of dryers in order to remove the last traces of moisture. Such apparatus, besides absorbing a considerable amount of motive power, are liable to rapid wear owing to their being always in contact with more or less acid solutions, and require a considerable expense for upkeep.

The subject matter of the present invention is an improved process by which perfectly dry ammonium salts are directly obtained in a solid and neutral condition without using any centrifugal machines or any dryers, hence in a much cheaper way.

The process according to the invention essentially distinguishes itself from those heretofore employed by the fact that instead of bubbling the gaseous ammonia through the acid, the acid is sprayed and atomized in an ammonia atmosphere.

The apparatus for carrying the process into effect is illustrated in the accompanying drawing; it should be understood, however, that the invention is by no means confined to the details indicated on the drawing.

The apparatus essentially comprises a reaction chamber A containing ammonia in gaseous condition; the acid is sprayed into this chamber by means of a suitable atomizer B positioned near the ceiling thereof. The degree of concentration of the acid should be so selected that the heat developed by the reaction of the acid with the ammonia is sufficient to evaporate all of the water contained in the acid.

For instance, for the production of ammonium sulfate it is sufficient to use sulphuric acid having a concentration of 50° Bé. The heat developed by the reaction is such that the temperature rises at once to 130° C. and all of the water present in the acid is thereby evaporated, whilst the salt formed collects on the bottom of the chamber and is continually removed therefrom by a screw conveyor C.

In order to remove the vapor thus formed, the mixture of ammonia and steam, present in the chamber A, is continually circulated through a rectification column E by a fan D. On traversing a cooling coil F disposed at the top of the rectification column E, the steam is condensed and forms an ammonia solution. This solution falls in said rectification column over a series of trays E' being in direct heat conductive contact with the very hot gases arriving from the reaction chamber. Said solution then gives off its gaseous ammonia whilst the remaining water is collected in the bottom of said rectification column and is discharged through automatic valve G connected to the lower portion of said rectification column.

Where gaseous ammonia is supplied by a plant for the production of synthetic ammonia, the ammonia is delivered direct into the reaction chamber through the cock H.

The acid supply regulator I serves to effect regulation of the quantity of the acid delivered with respect to the quantity of ammonia delivered. When the pressure inside of the reaction chamber tends to increase owing to the presence of an ammonia excess, the bell I' rises and thereby opens the valve L, the acid supply being thus increased. When on the contrary the ammonia delivery decreases, the pressure inside the reaction chamber also decreases, whereupon a closing of the valve L by the bell I' ensues; in this manner the equilibrium between the acid supply and the ammonia supply is automatically restored.

Where the available ammonia is in the form of aqueous solution, the heat generated by the reaction can be utilized to distill the ammonia. In such a case at the beginning, in order to start the apparatus, it is necessary to warm up the bottom portion of the rectification column by circulating steam controlled by valve N through the coil M, the condensed water being automatically discharged by the valve O.

The ammonia solution delivered into the rectification column through the cock P is preheated in the preheater Q at the expense of the heat of the water from the lower portion of said rectification column and is then delivered into the rectification column at the top of the latter.

Having now particularly described and ascertained the nature of my said invention and in what manner the same is to be performed, I declare that what I claim is:

1. The process of forming solid ammonium salts which comprises continuously atomizing a liquid acid into a chamber containing ammonia gas under such conditions that solid salts are obtained through evaporation of water introduced with the acid, continuously removing excess gas from the chamber, removing moisture from said gas and recirculating the so purified gas through the chamber together with fresh ammonia gas.

2. The continuous process for directly producing solid ammonium salts in dry form, which consists in spraying and atomizing acid intended to be combined with ammonia from the upper portion of a reaction chamber downward in a gravitational direction through an atmosphere of gaseous ammonia fed into said chamber simultaneously controlling the supply of acid by means of the gas pressure in the chamber, and continuously collecting and discharging the resulting solid salts deposited in the bottom of said reaction chamber.

3. The continuous process for directly producing solid ammonium salts in dry form from an aqueous solution of ammonia, consisting in spraying and atomizing a concentrated acid into an atmosphere of ammonia gas within a reaction chamber, the amount of ammonia being greater than that required for the occurring reaction, passing the ammonia and steam mixture resulting from said reaction to and through a rectification column, utilizing part of the heat generated by this reaction to distill within said rectification column the excess ammonia from said reaction chamber, whereby to condense the water and recuperate the gaseous ammonia present in said ammonia and steam mixture, and continuously collecting and discharging the resulting solid salts deposited at the bottom of the reaction chamber.

4. The continuous process for directly producing solid ammonium salts in a dry condition, consisting in spraying and atomizing a concentrated acid within a reaction chamber, the degree of concentration of which acid is such that the heat developed by the reaction of the acid with the ammonia is sufficient to evaporate the water present in the acid, into an atmosphere of ammonia gas within said reaction chamber, passing the ammonia and steam mixture resulting from this evaporation to and through a rectification column containing a cooling coil in order to condense the steam and recuperate the gaseous ammonia present in said ammonia and steam mixture, continuously collecting and discharging the resulting solid salts deposited at the bottom of the chamber where the reaction takes place, and returning to the cycle the gaseous ammonia which is recuperated from the rectification column.

GIACOMO FAUSER.